United States Patent [19]

Achgill

[11] Patent Number: 5,269,967
[45] Date of Patent: Dec. 14, 1993

[54] PROCESS FOR MITIGATING CHEMICAL AEROSOL CLOUDS

[76] Inventor: Robert F. Achgill, 1627 Neptune, Houston, Tex. 77062

[21] Appl. No.: 461,308

[22] Filed: Jan. 5, 1990

Related U.S. Application Data

[63] Continuation-in-part of Ser. No. 202,518, Jun. 6, 1988, abandoned.

[51] Int. Cl.$^5$ .............................................. B01D 17/00
[52] U.S. Cl. ..................................................... 95/233
[58] Field of Search ..................... 252/319, 189; 55/71, 55/74; 423/210, 240, 288

[56] References Cited

U.S. PATENT DOCUMENTS 2,436,432  2/1948  Hunter ..................................... 55/71
4,065,551 12/1977  Dahl ...................................... 423/488
4,125,593 11/1978  Scheifley et al. ...................... 423/488
4,154,804  5/1979  Walker et al. ...................... 423/488 X Primary Examiner—Marianne M. Cintins
Assistant Examiner—Catherine S. Kilby Scalzo
Attorney, Agent, or Firm—Bush, Moseley & Riddle

[57] ABSTRACT

A process to mitigate or "knockdown" a hydroscopic chemical aerosol cloud released to atmosphere from a pressurized vessel by utilizing a pressurized gas and water spray to provide water droplets having a mean volume diameter (MVD) in a median range between 150–350 microns. The pressurized water spray is directed onto the chemical aerosol cloud at a volume rate of at least five parts of water to one part of the hydroscopic chemical to obtain a maximum fallout rate within a minimal travel range.

1 Claim, 1 Drawing Sheet

PROCESS FOR MITIGATING CHEMICAL AEROSOL CLOUDS

CROSS-REFERENCE TO RELATED APPLICATION

This application is a continuation-in-part of copending application Ser. No. 202,518 filed Jun. 6, 1988, now abandoned.

BACKGROUND OF PRESENT INVENTION

This invention relates to a process to mitigate or "knockdown" hydroscopic chemical vapor or aerosol clouds, and more particularly, to such a process utilizing a gas atomized water spray of a predetermined droplet size.

Heretofore, it has been common to combat certain chemical vapor or aerosol clouds with a water spray. While a percentage of the droplets in various chemical aerosol clouds fall or drop to the surface or ground near the release of the aerosol, a substantial percentage of the droplets in a chemical aerosol cloud float substantial distances downwind. In the event hazardous chemicals are involved, it is desirable to have as much of the aerosol cloud as possible to fall on the ground at the release point.

Catastrophic sprayouts or emissions of toxic and hazardous chemicals present a serious threat to surrounding communities. Many of these chemical aerosol clouds are soluble in water and can be mitigated upon release through the use of water sprays. However, water sprays heretofore have been only partially effective and oftentimes have resulted in a long range fallout of the contaminated water spray as water droplets have not had maximum surface contact with the chemical droplets to cause a fallout.

SUMMARY OF THE INVENTION

The present invention is particularly directed to a process for mitigating chemical vapor clouds utilizing a water spray for obtaining maximum surface contact with the surface area of the chemical droplets. This has been accomplished by controlling the water droplet size to droplets having a mean volume diameter (MVD) in a critical median range between around 150 microns and 350 microns. Thus, if the median droplet diameter is 150 microns based on volumetric measurement, 50% of the water spray is in droplets less than 150 microns and 50% of the spray is in droplets larger than 150 microns. Likewise, if the median diameter is 350 microns, 50% of the water spray is in droplets less than 350 microns and 50% of the spray is in droplets greater than 350 microns diameter. The optimum size of water droplets has been found to be around 250 microns when the process was utilized with a hydrogen fluoride vapor cloud.

To obtain a predetermined water droplet size between around 150 and 350 microns, relatively large amounts of air are combined with water for discharge of an atomized water spray from an orifice of a predetermined size. Thus, an evenly distributed atomized water spray having a mean volume diameter (MVD) droplet size of 250 microns discharged from an orifice provides optimum results. For best results an air atomizing nozzle, such as utilized for producing artificial snow under freezing conditions, is utilized for providing the desired amount of air to obtain the predetermined water droplet size.

While a volume ratio between the water and the chemical cloud may vary somewhat depending on the particular type of chemical aerosols, a ratio of ten to one has been found to be satisfactory for hydrogen fluoride. For example, if a hydrogen fluoride leakage rate of eighty gallons per minute occurs, a water spray of 800 gallons per minute has been determined to be satisfactory for maximum contact with the chemical droplets and to provide sufficient cooling to offset the heat of dilution of the chemical with water in order to prevent or minimize any water vaporization and revaporization of the hydrogen fluoride out of solution. It is believed that a volume ratio of at least around 5 to 1, preferably around 10 to 1, and as high as 15 to 1, would function satisfactorily between the water droplets and chemical vapor droplets.

An aerated water spray having water droplets of a size in a median range between 150 and 350 microns and applied to a chemical aerosol cloud at a volume ratio of at least about 5 to 1 has been found to obtain maximum effectiveness in contacting and combining with the chemical vapor to mitigate or "knockdown" the chemical vapor clouds. Examples of the type of chemical vapor clouds to which this process is applicable include hydrogen fluoride, boron trifluoride, hydrogen chloride, phosgene, ammonia, and chlorine.

It is an object of this invention to provide a process utilizing a gas atomized water spray of a predetermined droplet size at a predetermined volume to mitigate or "knockdown" an atmospheric discharge of a hydroscopic chemical aerosol cloud.

It is a further object of this invention to provide such a process utilizing a gas atomized water spray in which the water droplets are of a diameter in a median range between 150 and 350 microns with the atomized water spray applied at a volume of at least around 5 parts of water to 1 part of chemical to obtain maximum surface contact with the chemical vapor for minimizing free floating of the chemical vapor away from its release point.

Other objects, features, and advantages of this invention will become more apparent after referring to the following specification and drawings.

BRIEF DESCRIPTION OF THE DRAWINGS

FIG. 1 is a graph showing the water droplet size in microns composed with the surface area of the droplets in square feet per gallon of water; and FIG. 2 is a graph showing the fallout range in feet compared with the water droplet size in microns.

Figures 1, 2:
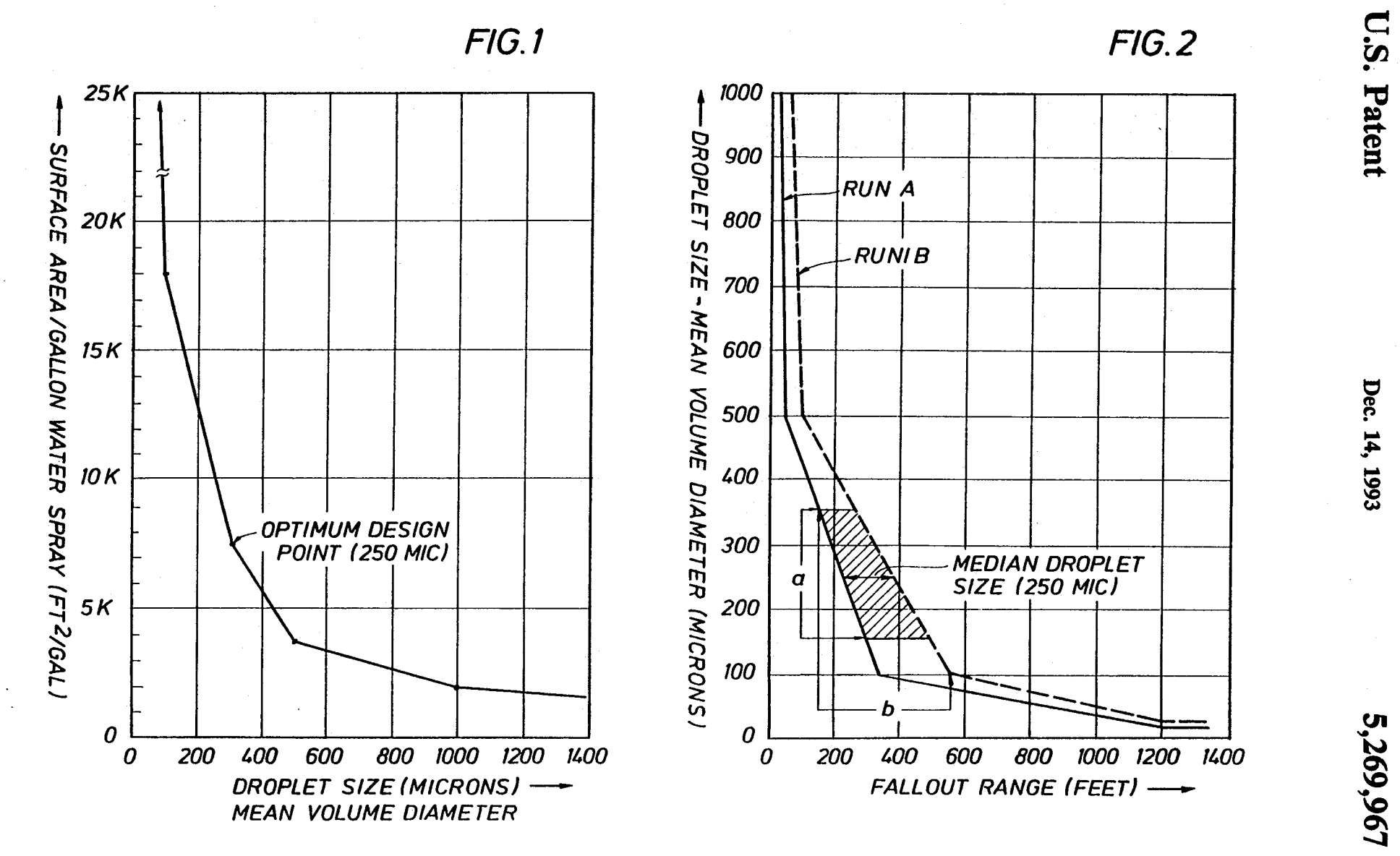

The graphs illustrated in FIGS. 1 and 2 have been derived mathematically and/or empirically determined.

The key to an effective and controlled knockdown utilizing water spray as a mitigation process in an open atmospheric chemical spill is the choice of waterspray droplet size. Water sprays applied in the droplet size range of 350 microns down to 150 micron diameter are preferred over droplets of greater diameter for two reasons.

The first is that the surface area per gallon of water spray is considerably enhanced as diameter is reduced down to 350 microns. Increased surface area of the water spray will likewise increase contact of water with the droplets of chemical in the cloud. The second advantage is the increased controlled resident time of the water droplets in the chemical cloud. As the surface area of the water droplet increases in proportion to the corresponding weight, aerodynamic drag increases resulting in slower freefall of the droplet of water. Increased resident time of the water droplets in the chemical cloud will result in a greater opportunity for contact with chemical droplets.

The use of droplet sizes less than 150 microns controls or limits the tendency of the smaller droplets to "fly off". Surface area per volume of water increases exponentially in diameter in sizes less than 100 microns. Water spray droplet size below 100 microns are subject to wind drift of the contaminated water spray over uncontrolled distances before fallout. Thus, the critical size between 150–350 microns confines the fallout range within definite prescribed boundaries calculated as a function of spray height and wind speed. See FIG. 2 for an example of fallout range vs. droplet size.

The following is an example of the use of this invention to mitigate a hydrogen fluoride aerosol vapor release of 80 gallons per minute in which an evenly distributed atomized water spray is distributed having a mean volume diameter (MVD) droplet size of 250 microns, and applied against the hydrogen fluoride vapor. The water spray is applied in quantities of 10 parts water to 1 part chemical or 800 gallons per minute of water to a cloud generated by a hydrogen fluoride leakage rate of 80 gallons per minute. The ratio of 10 parts water to 1 part hydrogen fluoride is adequate to provide sufficient cooling to offset the heat of dilution of the hydrogen fluoride with the water being of a temperature sufficiently low to prevent vaporizing of the water and revaporization of the hydrogen fluoride out of solution.

Next, a fallout range of contaminated water droplets is estimated as a function of wind speed, spray height, and droplet free fall speed data. To achieve the quantities of water needed at the required droplet size, an air/water atomization type nozzle, such as used in "snow making" is utilized. An evenly distributed fan pattern is preferable to maintain uniform droplet size. A typical "Snow Jet" nozzle, model #17012-F 250/17394-200, as manufactured by Spraying Systems Company, located at Chicago, Ill., was utilized having a capacity for supplying air or nitrogen at 800 SCFM @ 100 psig, and water at 80 gpm @150 psig thereby to sustain a water spray flow of 80 gpm per nozzle at 250 microns (mean volume diameter).

Ten nozzles are positioned directly above the path of the chemical aerosol cloud in a horizontal position pointing downwind to allow mixing and downward drift of the water spray through the hydrogen fluoride cloud as both move with the wind. The resulting fallout is further diluted and neutralized once on the ground. The resulting knockdown effectiveness of the hydrogen fluoride release has been found to be greater than 90% as confirmed in similar testing performed by Lawrence Livermore Laboratory at the Nevada DOE Test Site in Mercury, Nev.

The following is a comparison of the effectiveness between a water spray having droplets of a median size of 250 microns discharged from a "Snow Jet" nozzle and a water spray having water droplets of a median size of 520 microns discharged from a "Whirl Jet" nozzle manufactured by Spraying Systems Company of Chicago, Ill. The water droplet size of 250 microns from the "Snow Jet" nozzle is around thirteen (13) times more effective than the conventional water spray from the "Whirl Jet" nozzle having a water droplet size of 520 microns in the "knockdown" of a hydrogen fluoride cloud. The difference in effectiveness is attributed to a combination of the following: (1) resident time of water droplets in hydrogen fluoride cloud, (2) surface contact area per gallon of water, and (3) discharge pattern from the nozzle including direction and velocity.

For maximum effectiveness it is desirable to have a uniform pattern of water droplets with the water droplets being uniformly distributed in a pattern. Normally the pattern is a fan pattern extending from the discharge nozzle in a generally horizontal direction with the nozzle designed to provide a generally uniform mixture of pressurized air and water.

From the above, an improved process has been provided for the effective knockdown of a chemical cloud with a water spray containing a precise water droplet size range between 150–350 microns (MVD). The knockdown effectiveness is provided by an improved mixing or combining of the water particles with the chemical particles so that the chemical particles are immediately carried to the ground by the water particles. The improved mixing is obtained by the increased surface area provided by the relatively small water droplet size and the increased retention time in the chemical cloud. Other factors include an even application of the water spray with a uniform distribution of water droplets in the spray.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

I claim:

1. A process to mitigate a hydroscopic chemical which is hydrogen fluoride and leaked to atmosphere from a pressurized vessel to form a chemical aerosol cloud of finely divided chemical droplets; said process comprising the following steps:

providing an atomizing nozzle having a discharge orifice of a predetermined size;

supplying air to said nozzle at a rate of around 800 standard cubic feet per minute at a pressure of 100 psi and supplying water to said nozzle at a rate of around 80 gallons per minute at a pressure of 150 psi to provide an atomized water spray of a uniform mixture of pressurized air and water having finely divided water droplets of a mean volume diameter (MVD) in a median range of about 250 microns; and spraying said atomized water spray to atmosphere in a generally uniform fan pattern of water droplets from the discharge orifice to provide a generally uniform droplet size directly above the path of the chemical droplets of said chemical aerosol cloud in a generally horizontal downwind direction at a volume ratio between five and fifteen parts of water to one part of the hydroscopic chemical to provide maximum surface contact with the surface of said chemical droplets of said cloud upon downward drift of said water spray through said aerosol cloud to provide increased retention time in said chemical thereby to obtain maximum fallout rate for said chemical droplets within a minimal travel range.

* * * * *